United States Patent [19]

Greiner et al.

[11] Patent Number: 4,495,756

[45] Date of Patent: Jan. 29, 1985

[54] PICKUP ATTACHMENT FOR HARVESTING MACHINES

[75] Inventors: James G. Greiner, Leola; Edward H. Priepke, Lancaster, both of Pa.

[73] Assignee: Sperry Corporation, New Holland, Pa.

[21] Appl. No.: 523,476

[22] Filed: Aug. 15, 1983

[51] Int. Cl.³ .............................................. A01D 89/00
[52] U.S. Cl. ........................................ 56/364; 56/322
[58] Field of Search .............. 56/364, 321, 322, 12.7, 56/14.9

[56] References Cited

U.S. PATENT DOCUMENTS

| | | |
|---|---|---|
| 3,055,162 | 9/1962 | McClellan-Phillips ............... 56/364 |
| 3,126,693 | 3/1964 | Renn ..................... 56/364 |
| 3,141,284 | 7/1964 | Reynolds .............. 56/364 |
| 3,208,207 | 9/1965 | Bottenberg ................. 56/14.9 |
| 3,233,394 | 2/1966 | Lundell ................... 56/364 |
| 3,304,704 | 2/1967 | Lee ............................. 56/364 |
| 3,540,199 | 11/1970 | Lenzer et al. ..................... 56/364 |
| 3,881,302 | 5/1975 | Lokema .......................... 56/364 |

FOREIGN PATENT DOCUMENTS

| | | | |
|---|---|---|---|
| 878575 | 10/1961 | United Kingdom ................. | 56/364 |
| 1420860 | 1/1976 | United Kingdom ................. | 56/364 |

*Primary Examiner*—Robert P. Swiatek
*Assistant Examiner*—David I. Tarnoff
*Attorney, Agent, or Firm*—Darrell F. Marquette; Larry W. Miller; Frank A. Seemar

[57] ABSTRACT

A pickup attachment for use on crop harvesting machines wherein the pickup attachment includes a reel with a plurality of fingers connected to and rotatable about a central shaft in a predetermined path to pick up crop material. The pickup attachment is supported at one side by a wheel and at the other side by a roller positioned underneath the pickup attachment. The wheel is arranged with its center located substantially in alignment vertically with the axis of the reel central shaft while the roller is arranged with its center located rearward of the axis of the reel central shaft. This arrangement of the wheel and the roller allows the path of the reel fingers to follow the contour of the ground in proximity thereto when the pickup attachment is operated over rough or uneven terrain.

13 Claims, 4 Drawing Figures

PICKUP ATTACHMENT FOR HARVESTING MACHINES

BACKGROUND OF THE INVENTION

This invention relates generally to pickup attachments used on crop harvesting machines.

A typical pickup attachment includes a reel consisting of a plurality of fingers rotatable in a predetermined path in order to engage and pick up crop material from the ground. It is important for the path of these fingers to follow the contour of the ground in proximity thereto during operation so that a very high percentage of the crop material is picked up.

One conventional type of pickup attachment has been supported by what is commonly referred to as gauge wheels at the sides of the attachment. These gauge wheels are mounted on arms which extend forward of the pickup reel. This type of pickup attachment has a drawback when operated over rough or uneven terrain, in that the gauge wheels tend to lift the reel upward to an extent where the path of the fingers is not in proximity to the ground and thus the fingers fail to pick up some of the crop material.

Another conventional type of pickup attachment has been supported by what is commonly referred to as shoes or skids underneath the attachment. These shoes or skids slide along the surface of the ground during operation. When operated over rough or uneven terrain, this type of pickup attachment has a drawback in that the shoes tend to plow or dig into the ground. A method that is sometimes used to avoid this drawback is to lift the entire reel upward when traversing a rough or uneven area of ground. However, this is unacceptable since a considerable amount of crop material may not be picked up. The shoes also may damage new plant growth on any kind of terrain.

SUMMARY OF THE INVENTION

The present invention provides a pickup attachment supported at one side by a gauge wheel and at the other side by a roller positioned underneath the attachment. The pickup attachment includes a typical reel with the gauge wheel arranged so that its center is substantially in alignment vertically with the axis of the reel and with the roller arranged so that it is rearward of the axis of the reel and rearward of the center of the wheel.

This arrangement of the gauge wheel and the roller allows the path of the fingers of the reel to follow the contour of the ground in proximity thereto when operated over rough or uneven terrain.

DETAILED DESCRIPTION OF THE PREFERRED EMBODIMENT

Figure 1:
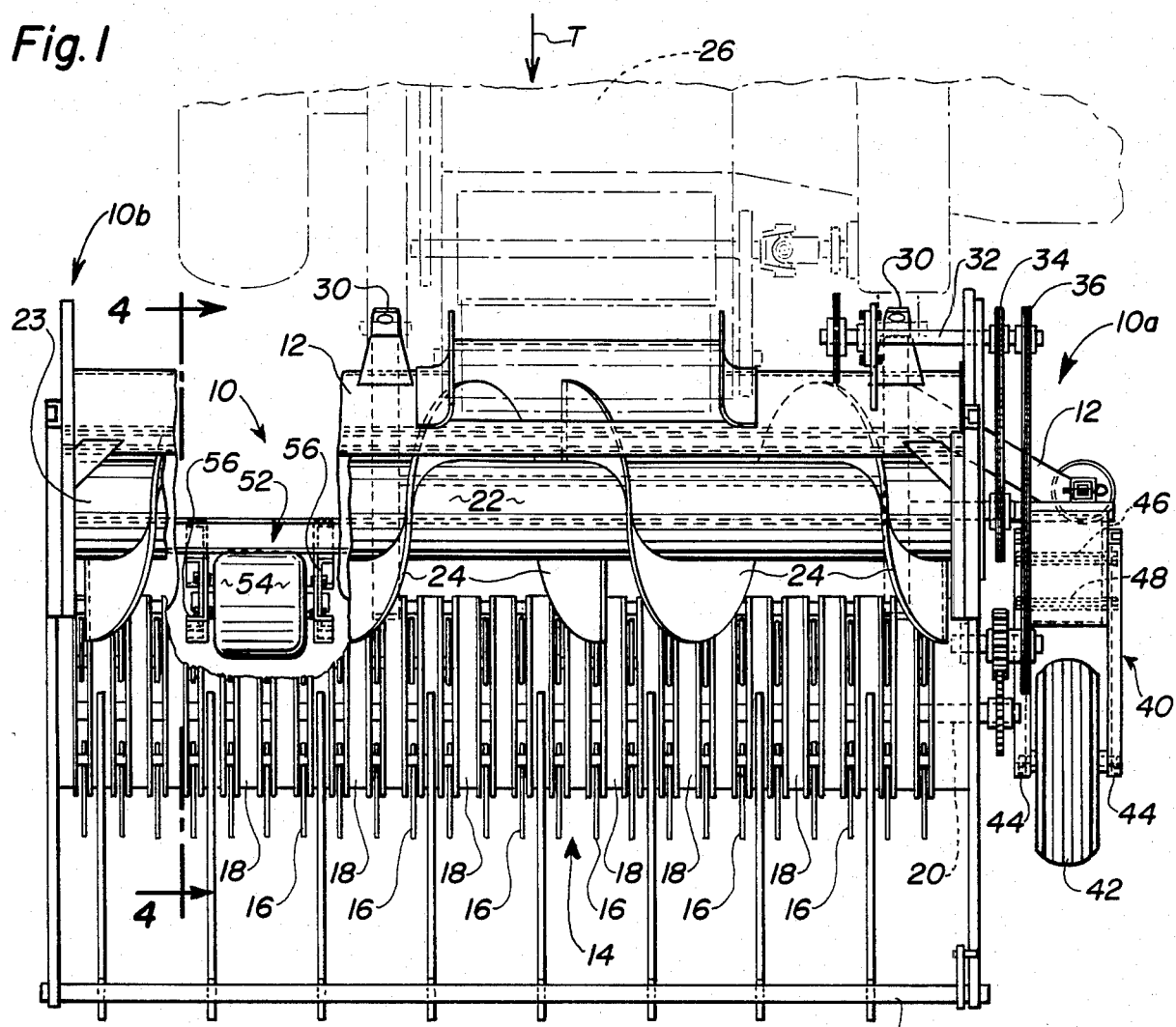
FIG. 1 is a top plan view of the pickup attachment according to the present invention.
Figure 2:
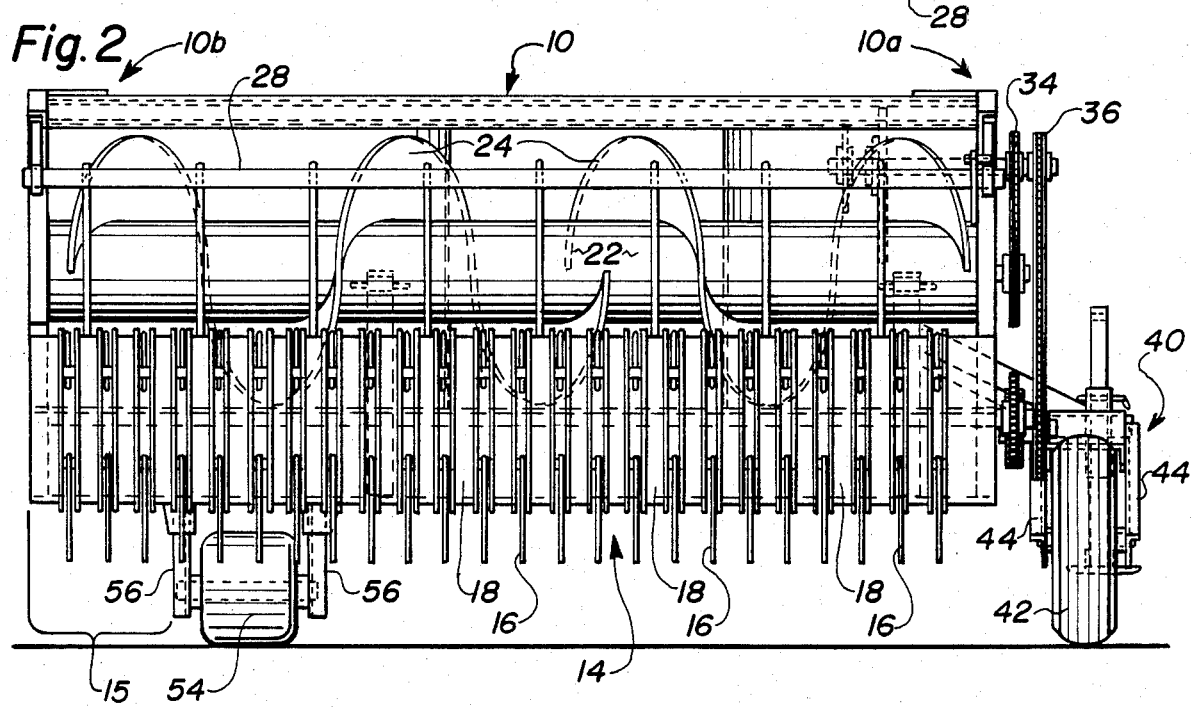
FIG. 2 is a front elevation view of the pickup attachment of FIG. 1.

Referring to FIGS. 1 and 2, the pickup attachment 10 according to the present invention includes a frame 12 supporting a reel 14 which has a series of projecting fingers 16 located between stripper plates 18. These fingers 16 are connected to a central shaft 20 for rotation to engage and pick up crop material. The frame 12 also preferably supports an auger 22 located above and behind the reel 14. The auger 22 receives crop material from the fingers 16 and the flighting 24 thereof consolidates the crop material toward the center of the pickup attachment 10 so that it can be fed into a crop harvesting machine such as a forage harvester 26. A conventional windguard 28 is mounted on the frame 12 to hold crop material down on the reel 14.

Figure 3:
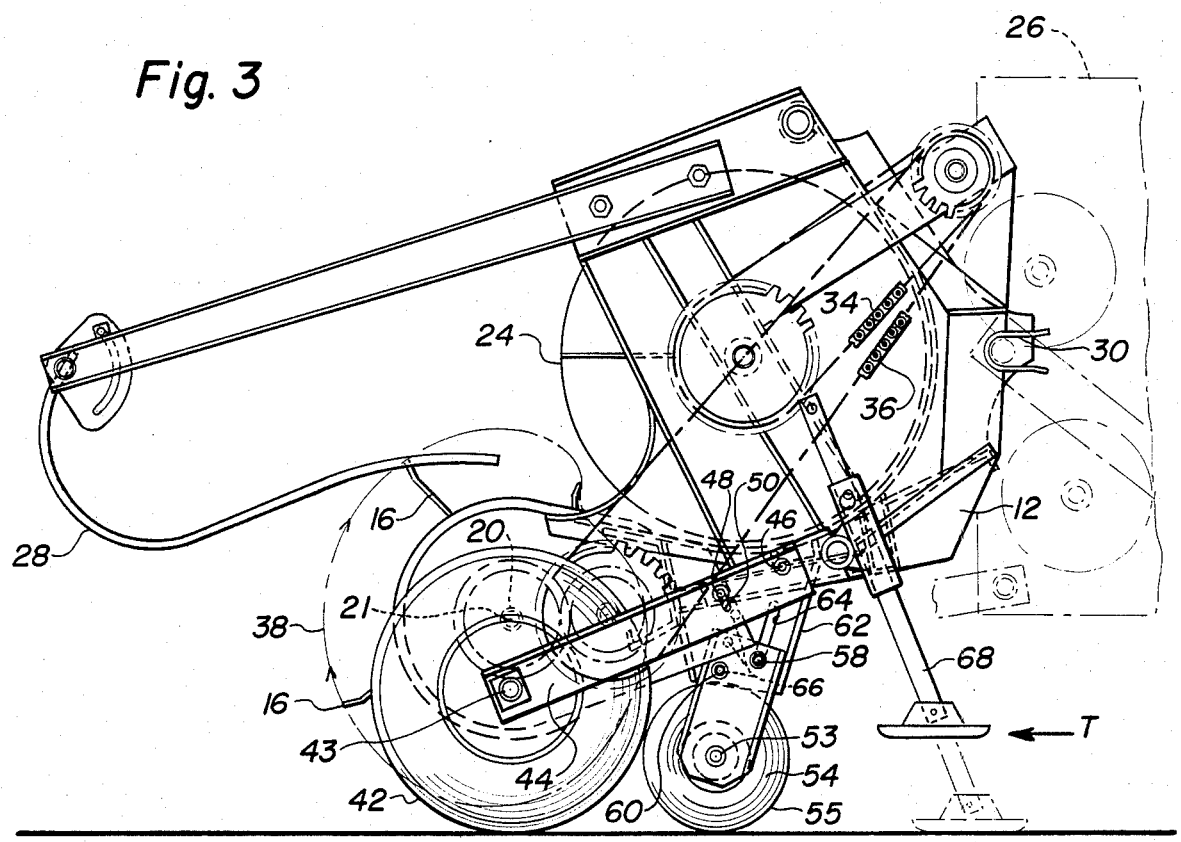
FIG. 3 is a side elevation view of the pickup attachment of FIG. 1.
Figure 4:
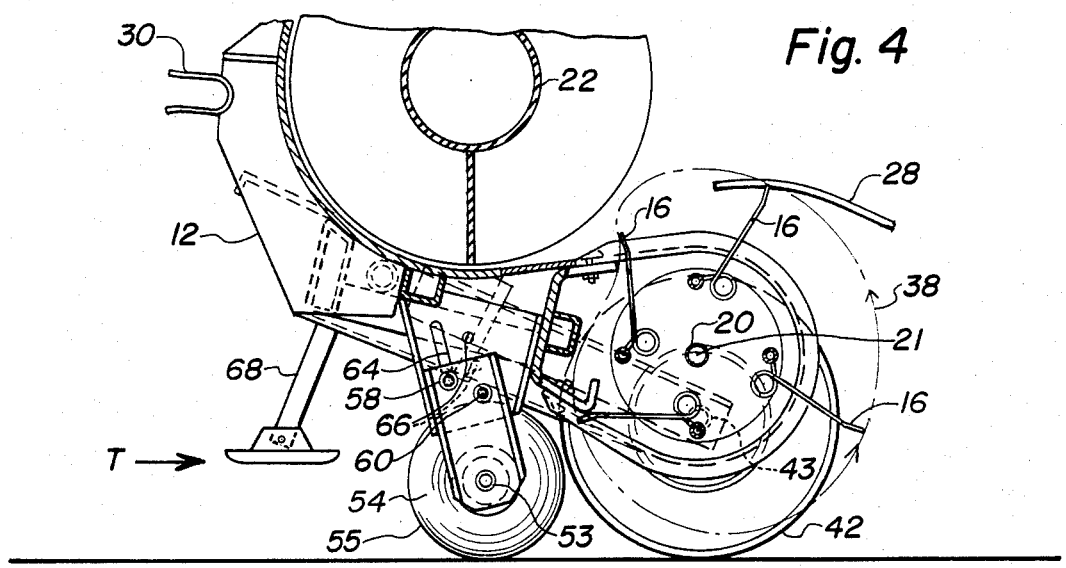
FIG. 4 is a partial side elevation view taken along lines 4—4 of FIG. 1.

The pickup attachment 10 is attached to the forage harvester 26 by pivot connections 30, and rotary driving power is delivered from the forage harvester 26 by conventional means to a drive shaft 32 on the pickup attachment 10. The drive shaft 32 then rotates the auger 22 and the fingers 16 of the reel 14 in known manner via the chains 34 and 36, respectively. As seen in FIGS. 3 and 4, the fingers 16 are rotated about the axis 21 of the central shaft 20 in a predetermined path 38.

The left-hand side 10a of the pickup attachment 10 (as viewed from behind the forage harvester 26 looking in the direction of normal travel T) is supported by a gauge wheel assembly 40 which includes a wheel 42 carried by a pair of arms 44. Bolts 46 and 48 are used to fasten the arms 44 to the frame 12. The arms 44 each have a slot 50 shown in FIG. 3 for receiving the bolt 48 to permit pivotal adjustment of the wheel 42 about the bolt 46 when both bolts 46 and 48 are loosened. The slots 50 are arranged and dimensioned so that the wheel 42 is only permitted to be disposed in positions where its center 43 is substantially in alignment vertically with the axis 21 of the reel central shaft 20. In the preferred embodiment, the wheel 42 is adjustable in the range where its center 43 is between one inch ahead of and one inch behind the reel central shaft axis 21.

The right-hand side 10b of the pickup attachment 10 (as viewed from behind the forage harvester 26 looking in the direction of normal travel T), is supported by a roller assembly 52 that includes a roller 54, preferably formed of rubber material, carried by a pair of arms 56. Bolts 58 and 60 are used to fasten the arms 56 to brackets 62 underneath the frame 12. Each bracket 62 includes a guide slot 64 for receiving the bolts 58 and a series of positioning holes 66 for receiving the bolts 60 to permit substantially vertical linear adjustment of the roller 54. The slots 64 and the holes 66 are arranged so that the roller 54 is positioned with its center 53 located behind the axis 21 of the reel central shaft 20 and behind the center 43 of the wheel 42. The outer surface 55 of the roller 54 is spaced from the path 38 of the fingers 16. Preferably, the roller 54 is linearly adjustable on a slight incline with respect to vertical in order to maintain substantially the same spacing between the outer surface 55 of the roller 54 and the path 38 of the fingers 16.

An extensible jack leg 68 is mounted on the frame 12 to support the rear of the pickup attachment 10 when it is disconnected from the forage harvester 26.

The above-described arrangement of the wheel 42 and the roller 54 allows the path 38 of the fingers 16 to follow the contour of the ground in proximity thereto when operated over rough or uneven terrain. A further advantage of this arrangement of the wheel 42 and the roller 54 is that the left end 23 of the auger 22, as seen in FIGS. 1 and 2, is open so that a window of crop material which is actually wider than the reel 14 may be picked up.

An important aspect of the present invention is that the roller 54 is located underneath the pickup attachment 10 in a position which provides a cantilevered end portion 15 (best shown in FIG. 2) on the reel 14 which is very useful when operating the pickup attachment 10 with its right-hand side 10b close to an obstacle such as a fence or a ridge along the side of a field.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In a pickup attachment for use on crop harvesting machines, said pickup attachment having a frame, a reel supported on said frame, said reel including fingers connected to and rotatable about a shaft in a predetermined path to engage and pick up crop material on the ground, the improvement comprising:
a wheel connected to said frame for supporting one side of said pickup attachment, said wheel being positioned so that its center is located substantially in alignment vertically with the axis of said shaft;
a roller connected to said frame and located underneath said pickup attachment for supporting the other side of said pickup attachment, said roller being positioned so that its center is located rearward of the axis of said shaft and rearward of the center of said wheel; and
said one side of said pickup attachment being supported solely by said wheel and said other side of said pickup attachment being supported solely by said roller to allow said predetermined path of said reel fingers to follow the contour of the ground in proximity thereto.

2. The improvement of claim 1, wherein said wheel is adjustably mounted on said frame.

3. The improvement of claim 1, wherein said roller is adjustably mounted on said frame.

4. The improvement of claim 1, wherein said wheel and said roller are each adjustably mounted on said frame.

5. The improvement of claim 2, wherein said wheel is pivotally adjustable.

6. The improvement of claim 3, wherein said roller is linearly adjustable.

7. The improvement of claim 6, wherein said roller is adjustable on a slight incline with respect to vertical.

8. The improvement of claim 1, wherein said roller is located in a position which provides a centilevered end portion on said reel.

9. The improvement of claim 5, wherein said wheel is carried by a pair of arms which are fastened to said frame.

10. The improvement of claim 9, further comprising a pair of bolts for fastening said pair of arms to said frame, each of said pair of arms having a slot formed therein for receiving one of said bolts to permit pivoting and adjustment of said pair of arms about the other one of said bolts.

11. The improvement of claim 6, wherein said roller is carried by a pair of arms which are fastened to said frame.

12. The improvement of claim 11, further comprising a pair of bolts for fastening said pair of arms to a pair of brackets disposed underneath said frame, each of said pair of brackets having a guide slot for receiving one of said bolts and also having a series of holes therein for receiving the other one of said bolts to permit linear adjustment of said pair of arms.

13. The improvement of claim 1, wherein said one side of said pickup attachment is the left-hand side of said pickup attachment and said other side of said pickup attachment is the right-hand side of said pickup attachment as viewed from behind said pickup attachment.

* * * * *